United States Patent Office 2,940,968
Patented June 14, 1960

2,940,968

DIMETHYLATED STEROIDS AND PROCESSES FOR PRODUCING SAME

Meyer Sletzinger, North Plainfield, and Walter A. Gaines, Rahway, N.J., assignors to Merck & Co., Inc., Rahway, N.J., a corporation of New Jersey No Drawing. Filed Oct. 1, 1958, Ser. No. 764,525

23 Claims. (Cl. 260—239.55)

This invention relates generally to new methods for making physiologically-active steroid compounds. More particularly, it is concerned with novel processes for preparing 6α,16-dimethyl steroids of the pregnane series and with new steroid substances which are intermediates in such novel processes. Still more specifically, it relates to the synthesis of 6α,16-dimethyl-3,20-diketo-17,20-dihydroxy steroids of the pregnane series. Such compounds, when oxygenated at the 11-position exhibit a very high degree of cortisone-like anti-inflammatory activity. Still more specifically, this invention is concerned with methods for converting a 5α,6α-oxido-16-methyl steroid to a 6α,16-dimethyl steroid and with novel steroid intermediates produced therein.

6α,16 - dimethyl-3,20-diketo-17α,21-dihydroxy steroids oxygenated at the 11-position, and 21-esters thereof, such as 6α,16α-dimethyl hydrocortisone; 6α,16α-dimethyl prednisone and prednisolone; 6α,16α-dimethyl-9α-fluoro prednisone and prednisolone; and 6α,16α-dimethyl-9α-fluoro hydrocortisone and the corresponding 16β-methyl compounds possess extremely high anti-inflammatory activity, and are especially effective for the treatment of arthritis and related diseases since they have a minimal amount of undesired side effects at the effective dosage level. It is an object of this invention to provide a novel synthesis of such substances. It is a further object to provide a synthesis of these useful materials from a 16-methyl-5α,6α-oxido-allopregnane. It is a still further object to provide novel 5α-hydroxy-6β,16-dimethyl-allopregnanes obtained as intermediates in this process. Other objects will be evident from the ensuing discussion of our invention and from the flow diagram hereinbelow.

The new processes and new steroid compounds of the invention are structurally depicted in flow chart 1, with respect to the preparation of 6α,16α-dimethyl steroid compounds. The same process is employed for making the corresponding 6α,16β-dimethyl compounds from a 5α,6α-oxido-16β-methyl steroid of the pregnane series (e.g. I, where the 16-methyl group is in the beta position).

FLOW CHART 1

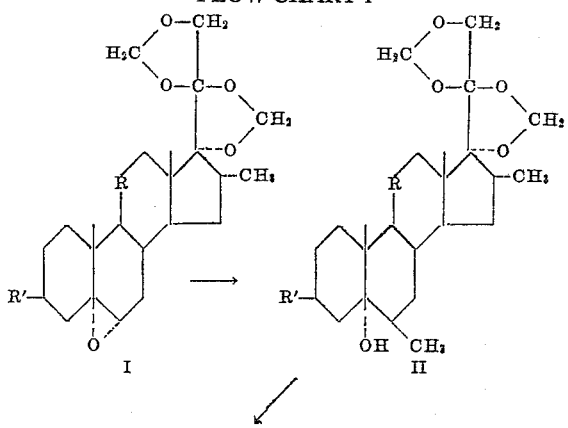

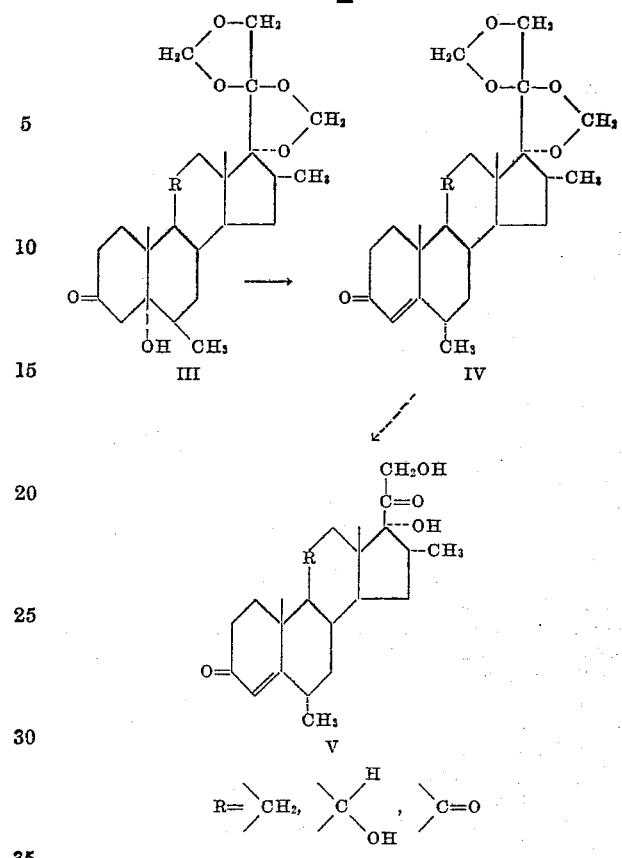

R'=group hydrolyzable to keto

The starting materials in this process are 5α,6α-oxides of Formula I hereinabove. The 3-position of the steroid nucleus contains a substituent hydrolyzable to a keto group. We prefer to employ an ethylenedioxy radical to block the 3-keto group, although other groupings such as ketals, thioketals and other cyclic ketals may also be utilized.

The initial step of our new process comprises the introduction of a 6-methyl substituent into the steroid nucleus by treating or reacting a 5α,6α-oxido-allopregnane of Formula I with a metallo-organic methylating compound, and in particular with a methyl Grignard reagent. As the methylating agent, we prefer to employ a methyl magnesium halide such as methyl magnesium bromide or iodide. If desired, a small amount of activating agent such as iodine or copper chloride may be used to initiate the reaction. Cleavage of the 5α,6α-oxide and introduction of the 5α-hydroxy and 6β-methyl substituents of Formula II is carried out in an inert organic solvent medium, preferably in the substantial absence of oxygen. Suitable solvents are benzene, toluene, ethyl ether, benzene-ether mixtures and the like. The methylation is preferably effected at an elevated temperature and it is convenient to carry out the process at the reflux temperature of the solvent medium. Upon completion of the reaction, the 5α-hydroxy-6β-methyl steroid is recovered by quenching the reaction mixture in the cold and isolating the steroid material from the organic solvent by extraction and crystallization techniques. In this fashion there are obtained steroids such as 6β,16α-dimethyl-17-20,20-21 bismethylenedioxy - 3 - ethylenedioxy-allopregnan-5α,11β-diol; 6β,16α-dimethyl-17-20,20-21 bismethylenedioxy-3-ethylenedioxy-allopregnan-5α-ol; and 6β,16α-dimethyl-17-20,20-21 bismethylenedioxy-3-ethylenedioxy-allopregnan-11-one-5α-ol, and the corresponding 16β-methyl compounds.

In the next step of this process, steroids of the general Formula II are treated with a dilute mineral acid or with anhydrous formic acid to remove the hydrolyzable substituent at the 3-position and regenerate a 3-keto group. For this purpose, we prefer to employ 5-10% sulfuric acid, dilute hydrohalic acid or 98% formic acid. The reaction is carried out preferably in an inert atmosphere, e.g. nitrogen or carbon dioxide, at about 50–90° C. for a short period. From 15 minutes to one hour is ordinarily sufficient to accomplish the hydrolysis of the ketal group. Lower alkanols such as methanol, ethanol or isopropanol are satisfactory media for this step of the process, although other water miscible organic solvents stable under the reaction conditions could also be utilized.

In the third step of the synthesis of this invention a 5α-hydroxy-6β-methyl allopregnane, structure III hereinabove, is reacted with a base in order to remove the elements of water from the 4:5 positions of the steroid nucleus, generate the 4:5 double bond and epimerize the 6β-methyl substituent to the alpha configuration. There is thus obtained a 3-keto-6α-methyl-Δ⁴-pregnene having the structure IV. To effect this reaction, the steroid is treated in solution with a base, and preferably with a strong base. Alkali metal hydroxide such as sodium, potassium and lithium hydroxides are very suitable for this purpose, although other bases such as calcium hydroxide might also be used. The reaction is brought about at temperatures of about 50–100° C. and is ordinarily substantially complete in 30 to 90 minutes. Lower alkanols have been found particularly suitable as solvent media. According to this process there are produced methylated steroids such as 6α,16α-(or 16β) dimethyl-17-20,20-21 bismethylenedioxy-4-pregnen - 3 - one - 11β-ol; 6α,16α-(or 16β)-dimethyl - 17-20,20-21 bismethylenedioxy-4-pregnene-3,11-dione and 6α,16α-(or 16β)-dimethyl-17-20,20-21 bismethylenedioxy-4-pregnen-3-one. Such compounds may be converted to the parent steroids by removal of the 17-20,20-21 bismethylenedioxy moiety. This is accomplished by heating the bismethylenedioxy steroid with an acid such as 50% aqueous acetic acid or 60% formic acid.

6α,16α-dimethyl cortisone and 6α,16α-dimethyl hydrocortisone (Formula V hereinabove, wherein R includes keto and hydroxy respectively) are themselves highly active anti-inflammatory agents. They may be converted to 6α,16α-dimethyl prednisone; 6α,16α-dimethyl prednisolone; the 9α-halo derivatives thereof; 6α,16α dimethyl 9α-halo hydrocortisone and 6α,16α dimethyl 9α-halo cortisone as described in copending application Serial No. 683,923, filed September 16, 1957.

Likewise 6α,16β-dimethyl cortisone and 6α,16β-dimethyl hydrocortisone have a very high degree of antiinflammatory activity. They are useful as antiinflammatory agents, and as intermediates in the synthesis of 6α,16β dimethyl-9α-halo hydrocortisone; 6α,16β-dimethyl-9α-halo cortisone; 6α,16β-dimethyl prednisone and prednisolone, and the 9α-halo derivatives thereof, all of which 6α,16β-dimethyl steroids are claimed in copending application Serial No. 764,523, filed on even date herewith.

The 6α,16-dimethyl-11-desoxy steroid compounds produced according to the methods of this invention are converted to the corresponding 11-oxygenated substances by microbiological hydroxylation techniques such as by fermentation with 11-hydroxylating strains of Curvularia lunata.

Thus, 6α,16α-dimethyl substance S (Formula V wherein R includes hydrogen) may be converted to 6α,16α-dimethyl hydrocortisone by treatment with an 11β-oxygenating microorganism such as known strains of Curvularia lunata.

In an additional embodiment of our invention, 6β,16-dimethyl-17-20,20-21 bismethylenedioxy-3-ethylenedioxy-5α-ol steroids of Formula II hereinabove may be converted directly to 6α,16-dimethyl-3,20-diketo-17α,21-dihydroxy steroids of Formula V hereinabove by treatment with an acid hydrolyzing agent under reaction conditions suitable for removal of the 17-20,20-21 bismethylenedioxy moiety. This embodiment of the invention, wherein Compound II is converted directly to Compound V is brought about by heating a steroid of Formula II with aqueous acetic acid or 60% formic acid.

The following examples are given for purposes of illustration and not by way of limitation:

EXAMPLE 1

*6β,16α-dimethyl-17-20,20-21 bismethylenedioxy-3-ethylenedioxy allopregnan-5α,11β-diol (II)*

To a solution of 250 mg. of 16α-methyl-17-20,20-21 bismethylenedioxy - 3 - ethylenedioxy - 5α,6α-oxido-allopregnane-11β-ol (I) in 60 ml. of dry benzene under nitrogen is added 2.33 ml. of 3 M methyl magnesium bromide in ether. The mixture is heated at 70° C. under nitrogen for five hours. After cooling to 0–5° C., 5.6 grams of ammonium chloride in 56 ml. of water is added over about a 20-minute period. The benzene is separated and the aqueous layer extracted with two 20 ml. portions of benzene. The combined benzene solutions are washed neutral with water, dried with magnesium sulfate and concentrated to dryness. The 6β,16α-dimethyl-17-20,20-21 bismethylenedioxy-3-ethylenedioxy allopregnan-5α,11β-diol thus obtained is normally used in the next step of the process without further purification. On recrystallization from ether or benzene it is obtained substantially pure, melting point 178–182° C.

EXAMPLE 2

*6β,16α-dimethyl-17-20,20-21 bismethylenedioxy-allopregnan-3-one-5α,11β-diol (III)*

A solution of two grams of 6β,16α-dimethyl-17-20,20-21 bismethylenedioxy - 3 - ethylenedioxy-allopregnan-5α,11β-diol in 100 ml. of methanol is purged four times with nitrogen. 10.9 ml. of 8% sulfuric acid (v./v.) is added, the mixture purged four times with nitrogen and then heated at reflux under nitrogen for 35 minutes. The mixture is cooled to 0–5° C. and with cooling and good agitation a solution of 10.9 grams of sodium carbonate in 300 ml. of water is added. The gummy precipitate is extracted with chloroform, washed with water and concentrated in vacuo to dryness. The mostly crystalline 6β,16α-dimethyl-17-20,20-21 bismethylenedioxy-allopregnan-3-one-5α,11β-diol thus obtained is used directly in the next reaction. It may be recrystallized from methanol or ethanol to give substantially pure material, melting point 235–239° C.

EXAMPLE 3

*6α,16α - dimethyl - 17 - 20,20 - 21 bisemthylenedioxy-4-pregnen-3-one-11β-ol (IV)*

A solution of two grams of 6β,16α-dimethyl-17-20,20-21 bismethylenedioxy-allopregnan-3-one-5α,11β-diol in 100 ml. of methanol is purged four times with nitrogen and then 4.2 ml. of 5% potassium hydroxide in methanol is added. After purging four times again, the solution is then refluxed under nitrogen for one hour. The solution is then cooled to 20° C. and acidified with a few drops of glacial acetic acid. 25 ml. of water is added and the solution concentrated in vacuo until essentially methanol-free. The slightly yellow crystalline product thus obtained is filtered, washed with water and dried to give 6α,16α-dimethyl-17-20,20-21 bismethylenedioxy-4-pregnen-3-one-11β-ol, melting point 270–275° C.

$\lambda_{Max.}^{MeOH}$ 2420, E% 302

On recrystallization from methanol the material melts at 275–280° C.

EXAMPLE 4

*6α,16α-dimethylhydrocortisone (V)*

A slurry of 970 mg. of 6α,16α-dimethyl-17-20,20-21 bismethylenedioxy-4-pregnen-3-one-11β-ol in 97 ml. of 60% formic acid is purged six times with nitrogen and then heated on a steam bath at about 93–95° C. for 15 minutes under nitrogen. The compound is completely in solution after about five minutes. The solution is then cooled in an ice bath and 100 ml. of water added. Twenty grams of sodium carbonate are added slowly over 20 minutes to give a gummy precipitate which is extracted with chloroform. The chloroform solution is washed acid free with saturated sodium bicarbonate solution and then washed with water. The chloroform is removed in vacuo and the residue flushed with 20 ml. of methanol and concentrated in vacuo to dryness.

The solid material thus obtained is dissolved in 45 ml. of purified methanol and purged six times with nitrogen. After adding 1.43 ml. of 0.21 M sodium methoxide in methanol, the solution is stirred for seven minutes at 20–25° C. under nitrogen. The solution is acidified with 3–4 drops of acetic acid, 5 ml. of water and 500 mg. of Darco G–60 charcoal added and the mixture stirred at room temperature for 20 minutes. After filtering off the carbon, 40 ml. of water is added and the solution concentrated in vacuo until essentially methanol free. The product is filtered and dried to give 6α,16α-dimethyl-hydrocortisone, melting point 201–209° C.

Recrystallization from ethyl acetate gives analytically pure material, melting point 239–242° C.

$\lambda_{Max.}^{MeOH}$ 2420, E% 391

EXAMPLE 5

*6β,16α - dimethyl-17-20,20-21 bismethylenedioxy-3-ethylenedioxy-allopregnan-11-one-5-α-ol*

200 mg. of 16α-methyl-17-20,20-21 bismethylenedioxy-3-ethylenedioxy-5α,6α-oxido-allopregnan-11-one is dissolved in 47 ml. of benzene and the solution purged with nitrogen. To the resulting solution is added 1.86 ml. of 3 M methyl magnesium bromide, and the resulting mixture stirred at 70° C. in a nitrogen atmosphere for five hours. It is then cooled to 0–5° C. and 4.5 grams of ammonium chloride in 45 ml. of water added over a 20-minute period. The layers are separated and the aqueous layer extracted with a small portion of benzene. All of the benzene solutions are combined, washed with three 25 ml. portions of water, dried over magnesium sulfate and concentrated to dryness in vacuo. The resulting 6β,16α-dimethyl-17-20,20-21 bismethylenedioxy-3-ethylenedioxy-allopregnan-11-one-5α-ol is used in the next step of the process without purification.

EXAMPLE 6

*6α,16α - dimethyl-17-20,20-21 bismethylenedioxy-4-pregnene 3,11-dione*

(a) 100 mg. of the product obtained as in Example 5 is dissolved in 5 ml. of methanol and the solution purged with nitrogen. 0.4 ml. of 8% aqueous sulfuric acid is then added and the mixture is refluxed for about 35 minutes in a nitrogen atmosphere. At the end of this time, the solution is cooled to 0–5° C. and treated with 0.4 gram of sodium carbonate in 12 ml. of water. The sodium carbonate solution is added slowly over a ten-minute period. 6β,16α-dimethyl-17-20,20-21 bismethylenedioxy-allopregnan-3,11-dione-5α-ol precipitated at this stage of the process. The slurry is cooled and the solid product recovered by filtration.

(b) The material obtained in part (a) of this example is dissolved, without further purification, in 5 ml. of methanol and to this solution is added 0.2 ml. of 5% methanolic potassium hydroxide. The alkaline solution is refluxed under nitrogen for one hour. It is then chilled and acidified with about three drops of glacial acetic acid. The solution is then concentrated in vacuo to remove the methanol. The residual solid is dissolved in chloroform and washed with sodium bicarbonate solution and water. The chloroform solution is dried over magnesium sulfate and concentrated to dryness in vacuo. 6α,16α-dimethyl-17-20,20-21 bismethylenedioxy-4-pregnene-3,11-dione is obtained as a yellow oil which crystallized on standing, $\lambda_{Max.}^{MeOH}$ 2380, E% 261

This latter compound is converted to 6α,16α-dimethyl cortisone by heating with 60% formic acid at about 90° C. for 15 minutes.

EXAMPLE 7

*6β,16α-dimethyl-17-20,20-21 bismethylenedioxy-allopregnan-3,11-dione-5α-ol*

100 mg. of the product of Example 5 is dissolved in 5 ml. of 98% formic acid and the mixture allowed to stand at room temperature for 2½ hours. At the end of this time 5 ml. of chloroform is added and the entire mixture poured into 25 ml. of water. The chloroform layer is separated, washed with sodium bicarbonate and water, dried over magnesium sulfate and concentrated to dryness in vacuo. The residual 6β,16α-dimethyl-17-20,20-21 bismethylenedioxy-allopregnan-3,11-dione-5α-ol thus obtained may be used without further purification in the next step of the process [Example 6(b)].

When this process is carried out on 6β,16α-dimethyl-17-20,20-21 bismethylenedioxy-3-ethylenedioxy-allopregnan-5α,11β-diol, there is obtained 6β,16α-dimethyl-17-20,20 - 21 bismethylenedioxy-allopregnan-3-one-5α,11β-diol.

EXAMPLE 8

*6β,16α-dimethyl-17-20,20-21 bismethylenedioxy-3-ethylenedioxy-allopregnan-5α-ol*

An oxygen-free solution of 125 mg. of 16α-methyl 17-20,20-21 bismethylenedioxy - 3 - ethylenedioxy - 5α,6α-oxido-allopregnane in 30 ml. of benzene is mixed with 1.5 ml. of 3M methyl magnesium iodide in ether, and the resulting mixture warmed at about 70° C. for four hours. It is then cooled to about 0° C. and quenched with 30 ml. of 10% aqueous ammonium chloride. The organic solvent layer is separated, washed with water until neutral and dried over magnesium sulfate. The organic solvents are removed by concentration to give 6β,16α-dimethyl-17-20,20-21 bismethylenedioxy-3-ethylenedioxy-allopregnan-5α-ol.

EXAMPLE 9

*6β,16α - dimethyl - 17-20,20-21 bismethylenedioxy-allopregnan-3-one-5α-ol*

One gram of 6β,16α-dimethyl-17-20,20-21 bismethylenedioxy-3-ethylenedioxy-allopregnan-5α-ol in 45 ml. of methanol is purged with nitrogen and mixed with 5 ml. of 8% sulfuric acid. The resulting solution is refluxed in an inert atmosphere for 30 minutes and then cooled to about 50° C. An aqueous solution of five grams of sodium carbonate in 150 ml. of water is then added with cooling and agitation. The resulting precipitate is extracted with chloroform. The chloroform extract is washed with water and concentrated to dryness to give 6β,16α-dimethyl-17-20,20-21 bismethylenedioxy-allopregnan-3-one-5α-ol.

EXAMPLE 10

*6α,16α - dimethyl-17-20,20-21 bismethylenedioxy-4-pregnen-3-one*

One gram of 6β,16α-dimethyl-17-20,20-21 bismethylenedioxy-allopregnan-3-one-5α - ol in 50 ml. of methanol is refluxed in a nitrogen atmosphere for one hour with 2 ml. of 5% methanolic sodium hydroxide. The solution is then cooled to about room temperature and acidified with glacial acetic acid. 15 ml. of water is added and the resulting solution concentrated to dryness in vacuo. The 6α,16α-dimethyl-17-20,20-21 bismethylenedioxy-4-pregnen-3-one thus obtained may be purified by recrystallization from a lower alkanol.

EXAMPLE 11

6α,16α-dimethyl-substance S

About 0.1 gram of 6α,16α-dimethyl-17-20,20-21 bis-methylenedioxy-4-pregnen-3-one is suspended in 18 cc. of 50% aqueous acetic acid, and the suspension is carefully purged with nitrogen, following which the suspension is heated on a steam bath under nitrogen for a period of about eight hours and then allowed to stand at room temperature for an additional period of 15 hours. The reaction solution is evaporated to dryness in vacuo to give 6α,16α-dimethyl-4-pregnen - 3,20 - dione - 17α,21 - diol- (6α,16α-dimethyl-substance S).

EXAMPLE 12

6α,16α-dimethyl hydrocortisone

Approximately three liters of a cortisone medium having the composition:

| | Grams |
|---|---|
| Dextrose | 50 |
| Enzymatic lactalbumin digest | 20 |
| Corn steep liquor | 5 |
| Distilled water to make 1 liter. | | is sterilized for 30 minutes at 120° C. The medium is then inoculated with approximately 125 ml. of a vegetative growth of a 11β-hydroxylated strain of *Curvularia lunata* and agitated for approximately 24 hours at a speed of 560 r.p.m. Air is passed in at the rate of 3 liters per minute, and the temperature maintained at 28° C.

At the end of the 24-hour period a sterile solution of approximately one gram of 6α,16α-dimethyl-substance S in 160 ml. of propylene glycol is added to the fermenting medium, and aeration and agitation continued as before for an additional 24 hours.

At the end of this time, the fermentation broth is filtered and extracted with 3–15 ml. portions of ethyl acetate. After washing with aqueous sodium bicarbonate and water, the combined ethyl acetate extracts are concentrated to dryness in vacuo. The 6α,16α-dimethyl hydrocortisone is recovered from the residual solid by chromatography on silica gel.

The starting materials for the processes of this invention, i.e. the 16α-methyl steroids of Formula I in the flow chart appearing hereinabove, are prepared from 16α-methyl cortisone and 16α-methyl substance S by a process which comprises treatment of a chloroform solution of such pregnenes with formaldehyde in the presence of hydrochloric acid to give a 16α-methyl-17-20,20-21 bis-methylenedioxy-3-keto-Δ⁴-pregnene, reaction of these latter compounds with ethylene glycol in the presence of p-toluene sulfonic acid to produce a 16α-methyl-17-20,20-21 bismethylenedioxy - 3 - ethylenedioxy-Δ⁵-pregnene, and treatment of such Δ⁵-pregnenes with perbenzoic acid in benzene to produce a 16α-methyl-17-20,20-21 bismethyl-enedioxy-3-ethylenedioxy-5α,6α-oxido - allopregnane of Formula I hereinabove. In more detail, these procedures, which are also described in the copending application of one of us, Serial No. 746,661, filed July 7, 1958, are as follows:

24 grams of 16α-methyl cortisone, 910 ml. of chloroform, 237 ml. of concentrated hydrochloric acid and 237 ml. of 37% formaldehyde are combined and stirred at room temperature for 70 hours. The chloroform layer is separated and the aqueous layer extracted with two 50 ml. portions of chloroform. The combined chloroform solution is then washed with two 200 ml. portions of water, 200 ml. of saturated sodium bicarbonate solution and 200 ml. of water. The magnesium sulfate dried chloroform solution is concentrated in vacuo to crystals, flushed with 100 ml. of methanol to remove all the chloroform and then sufficient methanol to dissolve the crystals is added. The methanol solution is concentrated in vacuo to a thick slurry and cooled to 0–5° C. After aging, the product is filtered, washed with two 15 ml. portions of cold methanol and dried in vacuo at 50° C. Yield 17.52 grams, melting point 231–236° C. (65%)

$$\lambda_{Max.}^{MeOH} \ 2380, \ E\% \ 362$$

A sample recrystallized from methanol melts at 244–250° C.

17.5 grams of 16α-methyl-17-20,20-21 bismethylene-dioxy-4-pregnene-3,11-dione is dissolved in 890 ml. of benzene and then 45 ml. of ethylene glycol and 1.78 grams of p-toluene sulfonic acid monohydrate added. The mixture is heated at reflux with stirring for 17.5 hours, continuously collecting the water formed. The solution is cooled to 20° C. and washed with two 200 ml. portions of water, 200 ml. of saturated sodium bicarbonate solution and 200 ml. of water. The washes are back extracted with benzene and all the benzene solutions combined. The dried benzene solution is concentrated to dryness in vacuo to give a mixture of crystals and oil. This mixture is refluxed with 100 ml. of ether for one-half hour, cooled, filtered and washed with cold ether. There is obtained 16α-methyl-17-20,20-21 bismethylenedioxy-3-ethylenedioxy-5-pregnen-11-one, melting point 211–216° C., on recrystallization from acetonitrile the melting point is 210–220° C.

A solution of 22.9 grams of 16α-methyl-17-20,20-21 bismethylenedioxy-3-ethylenedioxy-5-pregnen-11-one in 200 ml. of benzene is added to 460 ml. of 0.325 M perbenzoic acid solution over about 30 minutes keeping the temperature 20–25° C. After 48 hours at room temperature, the solution is cooled to 10° C. and with good agitation a 15% solution of sodium bisulfite added at less than 20° C. until a negative KI test is obtained. The aqueous phase is removed and the benzene washed acid free with 5% sodium bicarbonate and then washed with water. After drying, the benzene solution is concentrated in vacuo to yield 24.7 grams, $$[\alpha]_D^{CHCl_3} \ -88°$$

of solid, being of a mixture of 6α and 6β oxides in a ratio of about 6:4. They are separated by chromatography on fluorosil.

One gram of the mixed oxides is chromatographed on 100 grams of fluorosil. Elution with 5% acetone in hexane gives the β-oxide which is recrystallized from benzene-hexane to give 200 mg., melting point 236–242° C.

$$[\alpha]_D^{CHCl_3} \ -62°$$

The α-oxide, 16α-methyl-17-20,20-21 bismethylenedioxy-3-ethylenedioxy-5α,6α-oxido-allopregnan-11-one is eluted with 10% acetone in hexane to give material which when recrystallized from benzene-hexane melts at 236–243° C.

$$[\alpha]_D^{CHCl_3} \ -95°$$

A solution of 500 mg. of the 5α,6α-oxido compound obtained above in 35 ml. of tetrahydrofuran and a solution of 750 mg. of sodium borohydride in 20 ml. of water is purged six times with nitrogen stirred for 18 hours, the solution is cooled to 0–5° C. and a saturated solution of 4.7 grams of monobasic sodium phosphate added over about 15 minutes. The reaction is stirred for an additional 15 minutes. The slurry is then concentrated in vacuo to remove tetrahydrofuran keeping the temperature below 25° C. The slurry is cooled, filtered, and washed with water until neutral. There is obtained 16α-methyl-17-20,20-21 bismethylenedioxy-3-ethylenedioxy-5α,6α-oxido-allopregnane-11β-ol, melting point 280–291° C., $[\alpha]_D^{25} \ -110°$.

When this series of reactions is carried out on 16α-methyl-4-pregnen-3,20-dione-17α,21-diol (16α-methyl substance S) in the same fashion as described for 16α-methyl cortisone, there is obtained 16α-methyl-17-20,20-21 bismethylenedioxy - 3 - ethylenedioxy - 5α,6α - oxido-allopregnane.

16α-methyl cortisone, reported in J. Am. Chem. Soc. 80, 3160 (1958), is prepared in accordance with the following procedure:

A solution of 10.22 grams of methyl iodide in 50 ml. of ether is added to 1.73 grams of magnesium in 50 ml. of ether. To the resulting ethereal solution of methyl magnesium iodide, maintained under a nitrogen atmosphere, is added 0.045 gram of anhydrous cuprous chloride. To this mixture is added, over a period of about one hour, during which period the reaction mixture is stirred vigorously and maintained at approximately room temperature, a solution of about 5.6 grams of 16-pregnen-3α-ol-11,20-dione 3-acetate in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter material is heated for 15 minutes at 60–70° C. with a mixture of 25 ml. acetic anhydride and 25 ml. pyridine and acetylated product is purified by chromatography on acid-washed alumina followed by crystallization from petroleum ether to give approximately 1.5 grams of substantially pure 16α-methyl-pregnan-3α-ol-11,20-dione 3-acetate.

To a solution of 0.8 gram of 16α-methyl-pregnan-3α-ol-11,20-dione 3-acetate in 40 ml. of methanol is added 1.5 ml. of concentrated aqueous hydrochloric acid and the resulting solution is stirred overnight at about 25° C. The reaction solution is evaporated in vacuo at 25° C. to a small volume, and the concentrated solution is poured into 50 ml. of ice water. The white solid which precipitates is recovered by filtration, washed with water and recrystallized from ethyl acetate to give 16α-methyl-pregnan-3α-ol-11,20-dione.

A solution of 22 grams of 16α-methyl-pregnan-3α-ol-11,20-dione 3-acetate and one gram of p-toluene sulfonic acid in 250 ml. of acetic anhydride is heated at reflux under nitrogen for a period of approximately three days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is adsorbed on 660 grams of acid-washed alumina; the alumina adsorbate is then washed with two liters of petroleum ether. The adsorbate is then eluted with 85:15 petroleum ether-ether mixture, and the first four liters of eluate are collected, and evaporated to dryness in vacuo to give a mixture of enol acetates containing 16α-methyl-17(20)-pregnen-3α,20-diol-11-one 3,20-diacetate. This mixture of enolates, weighing approximately 14 grams, is dissolved in 50 ml. of benzene, an excess of perbenzoic acid is added, and the mixture is kept at about 25° C. for 16 hours. The reaction mixture is shaken with dilute aqueous potassium hydroxide solution until the benzene layer is free of perbenzoic acid; the benzene layer is then washed with water until neutral, dried and the solvent evaporated in vacuo to give a crystalline material, 16α-methyl-17α,20-epoxy-pregnan-3α,20-diol-11-one 3,20-diacetate. The latter material is dissolved, without purification, in 200 ml. of methanol, 120 ml. of water and 10 grams of potassium bicarbonate added and the resulting solution is heated at reflux under nitrogen for a period of 16 hours. The methanol is evaported from the hydrolysis solution in vacuo and the residual oil is extracted from the resulting aqueous solution with chloroform. The chloroform extract is washed with water to neutrality, dried and the chloroform is evaporated under reduced pressure. The residual oil is triturated with ether, and the crystalline material thus formed is recrystallized from ethyl-acetate-petroleum ether to give 16α-methyl-pregnan-3α,-17α-diol-11,20-dione.

To a solution of 7 grams of 16α-methyl-pregnan-3α,17α-diol-11,20-dione in 50 ml. of chloroform is added dropwise with stirring a solution containing 3.36 grams of bromine in 24.2 ml. of chloroform over a period of about 60 minutes. The reaction mixture is dissolved in 200 ml. of ethyl acetate, and the resulting solution washed with water until neutral, dried and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration and washed by slurrying with 50:50 ether-petroleum ether mixture to give about 5 grams of 21-bromo-16α-methyl-pregnan-3α,17α-diol-11,20-dione.

This 5 grams of 21-bromo-16α-methyl-pregnan-3α,17α-diol-11,20-dione is mixed with 5 grams of anhydrous potassium acetate, 4 grams of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered and the insoluble material is washed with acetone. The filtered solution is evaporated in vacuo thereby removing the solvents, and the residual material is slurried with water and the aqueous mixture extracted with ethyl acetate. The ethyl acetate extract is washed with water to neutrality, dried and the solvent is evaporated in vacuo to give an oil. This oil is crystallized from ether, and recrystallized from ethyl acetate ether to give 16α-methyl-pregnan-3α,17α,21-triol-11,20-dione 21-acetate.

A solution of 400 mg. of 16-α-methyl-pregnan-3α,17α,21-triol-11,20-dione 21-acetate in 4 ml. of pyridine is added to the complex formed by the addition of 400 mg. of chromium trioxide to 4 ml. of pyridine. The mixture is swirled until thoroughly mixed, and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and residual crystalline material is purified by crystallization from ethyl acetate to give 16α-methyl-pregnan-17α,21-diol-3,11,20-trione 21-acetate.

To 100 mg. of 16α-methyl-pregnan-17α,21-diol-3,11,20-trione 21-acetate dissolved in 2 ml. of chloroform and 2.25 ml. of glacial acetic acid, at a temperature of −55° C., is added two drops of 0.001 N solution of dry hydrogen bromide in glacial acetic acid. To about 0.38 ml. of 0.001 N hydrogen bromide in glacial acetic acid, at −55° C., is added 0.43 ml. of a solution containing 40 mg. of bromine in chloroform, and the resulting solution is added, over about a ten-minute period to the solution of the steroid while maintaining the reaction mixture at about −55° C. The reaction mixture is allowed to stand at −55° C. for about one-half hour; a solution containing 250 mg. of sodium acetate in 3 ml. of water is added, and the resulting mixture is stirred for about five minutes. 5 ml. of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about five hours, the reaction mixture is cooled and the acetone is evaporated in vacuo. The residual material is extracted into ether, the ether extract is washed with water, dried and the solvent is evaporated to a volume of about 1 ml.; petroleum ether is added to this solution and the crystalline material which separates is recovered and dried to give approximately 90 mg. of 4-bromo-16α-methyl-pregnan-17α,21-diol-3,11,20-trione 21-acetate.

A mixture of 33 mg. of semicarbazide, 90 mg. of 4 - bromo-16α-methyl-pregnan-17α,21-diol-3,11,20-trione 21-acetate, 90 mg. of anhydrous sodium sulfate, 0.3 ml. of dimethyl formamide and 3.5 ml. of chloroform is heated under reflux in contact with a nitrogen atmosphere for a period of about 45 minutes. 3 ml. of water are added to the reaction mixture and the resulting mixture is heated under reflux for about 10 minutes. The mixture is cooled, extracted with ethyl acetate and then washed and dried ethyl acetate extract evaporated to dryness in vacuo. The residual material is crystallized from methanol and recrystallized from ethyl acetate to give 16α - methyl - 4 - pregnen-17α,21-diol-3,11,20-trione 3-semicarbazone 21-acetate; melting point 225–228° C. (dec.).

A solution of 90 mg. of 16α-methyl-pregnen-17α,21-diol-3,11,20-trione-3-semicarbazone, 1.0 ml. of pyruvic acid, 1.0 ml. of glacial acetic acid and 1.0 ml. of water is allowed to stand for 20 hours at room temperature. The reaction solution is poured into 8 ml. of water and the aqueous mixture is extracted with 40 ml. of chloroform in six portions. The combined chloroform extract is washed with an aqueous solution of sodium bicarbonate, dried over sodium sulfate and evaporated in vacuo. The residual material is crystallized from acetone to give 16α-methyl-4-pregnen-17α,21-diol-3,11,20-trione.

16α-methyl substance S may be prepared from 16-pregnen-3α-ol-20-one 3-acetate following the procedures described immediately above for making 16α-methyl cortisone from 16-pregnen-3α-ol-11,20-dione 3-acetate. The intermediate products formed in synthesizing 16α-methyl - 4 - pregnen-3,20-dione-17α,21-diol (16α-methyl substance S) in this fashion are successively 16-methyl-pregnen-3α-ol-20-one 3-acetate; 16α - methyl - 17(20)-pregnen - 3α,20 - diol-3,20-diacetate; 16α-methyl-17α,20-epoxy-pregnen - 3α,20 - diol 3,20-diacetate; 16α-methyl-pregnen-3α,17α-diol-20-one; 21-bromo-16α-methyl-pregnan-3α,17α-diol-20-one; 16α-methyl-pregnan - 3α,17α,21-triol-20-one 21-acetate; 16α-methyl-pregnan-17α,21-diol-3,20-dione 21-acetate; 4-bromo - 16α - methyl-pregnan-17α,21-diol-3,20-dione 21-acetate and 16α-methyl-4-pregnen-17α,21-diol-3,20-dione 3-semicarbazone 21-acetate.

EXAMPLE 13

6β,16β - dimethyl-17-20,20-21 bismethylenedioxy-3-ethylene-dioxy allopregnan-5α,11β-diol To a solution of 500 mg. of 16β-methyl-17-20,20-21 bismethylenedioxy-3-ethylendioxy-5α,6α-oxido - allopregnane-11β-ol in 115 ml. of dry benzene under nitrogen is added 5 ml. of 3 M methyl magnesium bromide in ether. The mixture is heated at 70° C. under nitrogen for four hours. After cooling to 0–5° C., 10 grams of ammonium chloride in 100 ml. of water is added over about a 30-minute period. The benzene is separated and the aqueous layer extracted with two 30 ml. portions of benzene. The combined benzene solutions are washed neutral with water, dried with magnesium sulfate and concentrated to dryness. The 6β,16β-dimethyl-17-20,20-21 bismethylenedioxy-3-ethylenedioxy allopregnan-5α,11β-diol thus obtained may be used in the next step of the process without further purification. It is purified, if desired, by recrystallization from ether or benzene.

EXAMPLE 14

6β,16β-dimethyl-17-20,20-21 bismethylenedioxy-allopregnan-3-one-5α,11β-diol

A solution of one gram of 6β,16β-dimethyl-17-20,20-21 bismethylenedioxy-3-ethylenedioxy-allopregnan - 5α,11β-diol in 60 ml. of methanol is purged four times with nitrogen. Five ml. of 8% sulfuric acid (v./v.) is then added, the mixture purged with nitrogen and then heated at reflux under nitrogen for 30 minutes. The mixture is then cooled to 0–5° C. and with cooling and strong agitation a solution of 6 grams of sodium carbonate in 150 ml. of water is added. The resulting precipitate is extracted with chloroform, washed with water and concentrated in vacuo to dryness. The 6β,16β-dimethyl-17-20, 20-21 bismethylenedioxy - allopregnan-3-one-5α,11β-diol thus obtained is used directly in the next reaction. It may be recrystallized from a lower alkanol to give substantially pure material.

EXAMPLE 15

6α,16β - dimethyl-17-20,20-21 bismethylenedioxy-4-pregnan-3-one-11β-ol

A solution of one gram of 6β,16β-dimethyl-17-20,20-21 bismethylenedioxy-allopregnan-3-one-5α,11β-diol in 50 ml. of methanol is purged with nitrogen and then 2 ml. of 5% potassium hydroxide in methanol is added slowly. After repurging with nitrogen, the solution is refluxed under nitrogen for one hour. It is then cooled to 20° C. and acidified with a few drops of glacial acetic acid. 15 ml. of water is added and the solution concentrated in vacuo until essentially solvent-free. The slightly yellow product thus obtained is filtered, washed with water and dried to give 6α,16β-dimethyl-17-20,20-21 bismethylenedioxy-4-pregnen-3-one-11β-ol.

EXAMPLE 16

6α,16β-dimethyl-4-pregnene-3,20-dione-11β,17α,21-triol

A slurry of one gram of 6α,16β-dimethyl-17-20,20-21 bismethylenedioxy-4-pregnen-3-one-11β-ol in 97 ml. of 60% formic acid is purged with nitrogen and then heated on a steam bath at about 90° C. for 15 minutes under nitrogen. The solution is then cooled in an ice bath and 100 ml. of water added. Twenty grams of sodium carbonate are added slowly over 20 minutes. The resulting precipitate is extracted with chloroform, the chloroform solution washed acid free with saturated sodium bicarbonate solution and then with water. The chloroform is removed in vacuo and the residue flushed with 20 ml. of methanol and concentrated in vacuo to dryness.

The solid material obtained above is dissolved in 45 ml. of purified methanol and purged with nitrogen. After adding 1.5 ml. of 0.21 M sodium methoxide in methanol, the solution is stirred for about 7 minutes at 20–25° C. under nitrogen. The solution is then acidified with acetic acid, 5 ml. of water and 500 mg. of activated charcoal added and the mixture stirred at room temperature for 20 minutes. After filtering off the carbon, 40 ml. of water is added and the solution concentrated in vacuo. The solid is filtered and dried to give 6α,16β-dimethyl-4-pregnene - 3,20 - dione-11β,17α,21-triol (6α,16β-dimethyl hydrocortisone).

C–21 esters of 6α,16β-dimethyl hydrocortisone are prepared by reacting the free alcohol with an acylating agent such as a lower alkanoic acid anhydride or a lower alkanoyl halide. The C–21 acetate is obtained by adding 0.1 gram of 6α,16β-dimethyl hydrocortisone to 1 ml. of acetic anhydride and 1 ml. of pyridine. The resulting mixture is warmed on a steam bath for 20 minutes, then cooled and poured into 5 ml. of cold water. The aqueous solution is extracted twice with an equal volume of chloroform, the chloroform solution washed with water and dried, and the chloroform then removed in vacuo to give substantially pure 6α,16β-dimethyl hydrocortisone acetate.

Other esters such as the propionate, t-butyl acetate, benzoate, phosphate and the like are prepared in a similar fashion using the appropriate acylating agent.

EXAMPLE 17

6β,16β-dimethyl-17-20,20-21 bismethylenedioxy-3-ethylenedioxy-allopregnan-11-one-5α-ol Two grams of 16β-methyl-17-20,20-21 bismethylenedioxy-3-ethylenedioxy - 5α,-6α-oxido - allopregnan-11-one is dissolved in 450 ml. of benzene and the solution purged with nitrogen. To the resulting solution is added 18 ml. of 3 M methyl magnesium bromide, and the resulting mixture stirred at 70° C. in a nitrogen atmosphere for six hours. It is then cooled to 0–5° C. and 450 ml. of 10% aqueous ammonium chloride slowly added over about 30 minutes. The resulting layers are separated and the aqueous layer extracted twice with small portions of benzene. All of the benzene solutions are then combined, washed with three 100 ml. portions of water, dried over magnesium sulfate and concentrated to dryness in vacuo. The resulting 6β,16β-dimethyl-17-20,20-21 bismethylenedioxy - 3 - ethylene - dioxy-allopregnan-11-one-5α-ol may be used in the next step of the process without purification.

EXAMPLE 18

*6α,16β-dimethyl-17-20,20-21 bismethylenedioxy-4-pregnene-3,11-dione*

(a) 500 mg. of the product of Example 17 is dissolved in 30 ml. of methanol and the solution purged with nitrogen. Two ml. of 10% aqueous sulfuric acid is then added slowly and the mixture refluxed under nitrogen for about 35 minutes. The solution is cooled to 0–5° C., and treated with 2 grams of sodium carbonate in 50 ml. of water. The sodium carbonate solution is added slowly over a 15-minute period. 6β,16β-dimethyl-17-20, 20-21 bismethylenedioxy-allopregnan - 3,11 - dione-5α-ol precipitates at this point. The slurry of steroid is cooled and the solid recovered by filtration.

(b) The material obtained in part (a) above is dissolved in 25 ml. of methanol and to this solution is added one ml. of 5% methanolic potassium hydroxide. The resulting solution is refluxed in an inert atmosphere for one hour. It is then cooled and acidified with glacial acetic acid. The solution is then concentrated in vacuo and the residual solid dissolved in chloroform, and washed with sodium bicarbonate solution and water. The chloroform solution is dried over magnesium sulfate and concentrated to dryness in vacuo. The residual 6α,16β-dimethyl-17,20,20-21 bismethylenedioxy-4-pregnene - 3,11-dione crystallizes on standing, and is converted to 6α,16β-dimethyl cortisone by treatment with 60% formic acid at 80° C. for thirty-five minutes.

EXAMPLE 19

When the process of Examples 13–16 are carried out employing 16β-methyl-17-20,20-21 bismethylene-dioxy-3-ethylenedioxy - 5α,6α - oxido - allopregnane-11β-ol as the starting material of Example 13, there is obtained 6α,16β-dimethyl-4-pregnen-17α,21-diol-3,20-dione.

The 16β-methyl-17-20,20-21 bismethylenedioxy-3-ethylenedioxy-5α,6α-oxido-11-oxygenated - allopregnanes employed as starting materials for making the 16β-methyl compounds of this invention are prepared as follows:

To a solution of 3α-acetoxy-16-pregnene-11,20-dione in a mixture of tetrahydrofuran and ethyl ether is added diazomethane to produce 3α-acetoxy-16α,17α-methyleneazopregnane-11,20-dione (melting point 186–190° C.) which precipitates from solution. Heating this compound at about 180° C. in vacuo produces 3α-acetoxy-16-methyl-16-pregnene-11,20-dione (melting point 165–167° C.) which upon reaction with hydrogen peroxide in the presence of sodium hydroxide in methanol solution for 18 hours at room temperature affords 16α,17α-epoxy-3α-hydroxy - 16β - methyl - pregnane - 11,20 - dione (melting point 178–180° C.). When this compound is treated with perchloric acid in aqueous dioxane at 25–30° C. for 65 hours and the resulting reaction mixture is diluted with water, a mixture of 3α,17α-dihydroxy-16-methyl-15-pregnene - 11,20-dione and 3α,17α-dihydroxy-16-methylene-pregnane (melting point 158–167° C.) is precipitated and recovered by filtration. Reduction of this mixture with hydrogen in methanol in the presence of palladium-calcium carbonate catalyst affords a mixture of 3α,17α-dihydroxy-16α-methyl-pregnane - 11,20-dione and 3α,17α-dihydroxy-16β-methyl-pregnane - 11,20-dione sintering at 150° C. Bromination of this mixture with bromine in chloroform at 40–45° C. affords a mixture of 21-bromo-3α,17α-dihydroxy-16α-methyl - pregnane-11,20 - dione and 21-bromo-3α,17α-dihydroxy - 16β-methyl-pregnane-11,20-dione which upon reaction with potassium acetate and potassium iodide in acetone produces a mixture of 3α,17α,21 - trihydroxy-16β-methyl - pregnane - 11.20-dione 21-acetate and 3α,17α,21-trihydroxy - 16α-methyl-pregnane-11,20-dione 21-acetate. To a solution of this mixture in aqueous t-butanol at 10–15° C. is added N-bromosuccinimide to produce a mixture of 17α,21-dihydroxy-16α-methyl-pregnane-3,11,20-trione 21-acetate and 17α,21-dihydroxy-16β-methyl-pregnane-3,11,20-trione 21-acetate which on chromatography on neutral alumina and elution with chloroform-benzene (1:1) and benzene yields 17α,21-dihydroxy-16β-methyl-pregnane-3,11,20-trione 21-acetate (melting point 210–213° C.). Reaction of this compound with bromine in a mixture of acetic acid and chloroform affords the corresponding 4-bromo compound (melting point 165–170° C. dec.) which is converted by reaction with semicarbazide to a 3-semicarbazone of 17α,21 - dihydroxy-16β-methyl-4-pregnene-3,11,20-trione 21-acetate. Treatment of this compound with a mixture of acetic acid and pyruvic acid gives 17α,-21 - dihydroxy-16β-methyl-4-pregnene - 3,11,20-trione 21-acetate (melting point 226–232° C.). This latter substance is then hydrolyzed to the C-21 free alcohol by treatment with potassium bicarbonate or potassium hydroxide in aqueous methanol. Such compounds are described in more detail in the copending application of Taub et al. Serial No. 722,390, filed March 19, 1958.

Ten grams of 16β-methyl-4-pregnen-17α,21-diol-3,11, 20-trione are dissolved in 400 cc. of chloroform. To this solution is added a mixture of 100 cc. of 37% aqueous formaldehyde solution. The resulting mixture is stirred for a period of approximately three days at room temperature. The chloroform layer is separated, washed with sodium bicarbonate solution until neutral, then with water, dried over anhydrous sodium sulfate, and evaporated to dryness in vacuo. The residual crude material is purified by crystallization from a mixture of methylene chloride and methanol to give 17-20,20-21 bismethylenedioxy-16β-methyl-4-pregnene-3,11-dione, which is substantially pure.

17.5 grams of 16β-methyl-17-20,20-21 bismethylenedioxy cortisone is dissolved in 890 ml. of benzene, 45 ml. of ethylene glycol and 1.78 grams of p-toluene sulfonic acid, and the mixture heated at reflux for 17.5 hours. During this time a water separator is used to remove the water as it distills. The reaction mixture is then cooled to 20° C., washed with two 200 cc. portions of water, 200 cc. of saturated sodium bicarbonate solution and 200 cc. of water. The organic layer is dried over anhydrous magnesium sulfate and concentrated to a solid. The solid after trituration with ether yields 12.4 grams of 16β-methyl-17-20,20-21 bismethylenedioxy-3-ethylenedioxy-5-pregnen-11-one.

To a stirred solution of two grams of lithium aluminum hydride in 200 ml. of dry tetrahydrofuran under nitrogen is added a solution of two grams of 16β-methyl-17-20,20-21 bismethylenedioxy-3-ethylenedioxy-5-pregnen-11-one in 100 ml. of tetrahydrofuran. The reaction mixture is stirred and refluxed for two hours and then cooled to 5° C. Ethyl acetate (50 ml.) is added cautiously followed by 50 ml. of saturated sodium sulfate solution and then 50 grams of anhydrous magnesium sulfate. The mixture is filtered and the inorganic precipitate washed with ethyl acetate; the combined washings and filtrate are taken to dryness in vacuo to yield a residue consisting primarily of 16β-methyl-17-20,20-21 bismethylenedioxy-3-ethylenedioxy-5-pregnene-11β-ol.

A solution of 10 grams of 16β-methyl-17-20,20-21 bismethylenedioxy-3-ethylenedioxy-11-R-5-pregnene (where R is keto or hydroxy) in 100 ml. of benzene is added to 225 ml. of 0.325 M perbenzoic acid solution over about 30 minutes keeping the temperature 20–25° C. After 48 hours at room temperature, the solution is cooled to 10° C. and with good agitation a 15% solution of sodium bisulfite added at less than 20° C. until a negative KI test is obtained. The aqueous phase is removed and the benzene washed acid free with 5% sodium bicarbonate and then washed with water. After drying, the benzene solution is concentrated in vacuo to yield a mixture of 5α,6α and 5β,6β-oxides.

One gram of the mixed oxides is chromatographed on 100 grams of fluorosil. Elution with 5% acetone in hexane gives the β-oxide. The α-oxide, 16β-methyl-17-20,20-21 bismethylenedioxy-3-ethylenedioxy-5α,6α-oxido-11-R-allopregnane is eluted with 10% acetone in hexane. In this fashion 16β-methyl-17-20,20-21 bismethylenedioxy-3-ethylenedioxy-5α,6α-oxide-allopregnan-11β-ol and 16β-methyl-17-20,20-21 bismethylenedioxy-3-ethylenedioxy-5α,6α-oxido-allopregnan-11-one are prepared.

When 3α-acetoxy-16-pregnen-20-one is put through the above series of reactions, there is produced 16β-methyl-17-20,20-21 bismethylenedioxy-3-ethylenedioxy-5α,6α-oxido-allopregnane, which substance may also be utilized as one of the starting materials in the processes of our invention.

Any departure from the above description which conforms to the present invention is intended to be included within the scope of the claims.

What is claimed is:

1. 6β,16α-dimethyl-17-20,20-21 bismethylenedioxy-3-ethylenedioxy-allopregnan-5α-ol.

2. 6β,16α-dimethyl-17-20,20-21 bismethylenedioxy-allopregnan-3-one-5α-ol.

3. 6β,16α-dimethyl-17-20,20-21 bismethylenedioxy-3-ethylenedioxy-allopregnan-11-one-5α-ol.

4. 6β,16α-dimethyl-17-20,20-21 bismethylenedioxy-allopregnan-3,11-dione-5α-ol.

5. The process for preparing a steroid of the formula

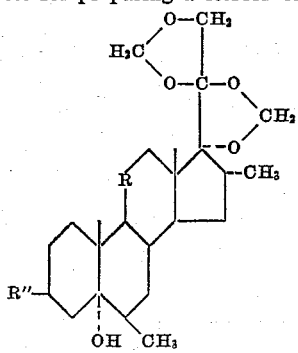

that comprises treating a compound of the formula

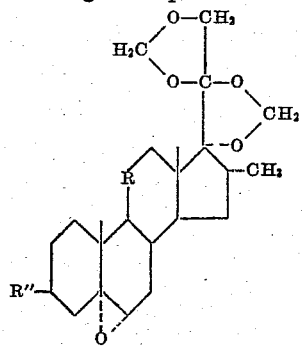

with methyl magnesium halide, wherein R is selected from the class consisting of

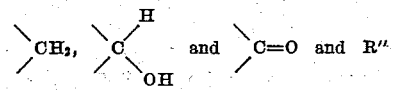 and R″ is a group convertible to a keto group on hydrolysis.

6. The process for preparing 6β,16α-dimethyl-17-20,20-21 bismethylenedioxy - 3 - ethylenedioxy-allopregnan-5α,11β-diol that comprises treating 16α-methyl-17-20,20-21 bismethylenedioxy - 3 - ethylenedioxy-5α,6α-oxido-allopregnane-11β-ol with methyl magnesium halide.

7. The process for preparing 6β,16α-dimethyl-17-20,20-21 bismethylenedioxy-3-ethylenedioxy-allopregnan-5α-ol that comprises treating 16α-methyl-17-20,20-21 bismethylenedioxy - 3 - ethylenedioxy-5α,6α-oxido-allopregnane with methyl magnesium halide.

8. The process for preparing 6β,16α-dimethyl-17-20,20-21 bismethylenedioxy-3-ethylenedioxy-allopregnan-11-one-5α-ol that comprises treating 16α-methyl-17-20,20-21 bismethylenedioxy - 3 - ethylenedioxy-5α,6α-oxido-allopregnane-11-one with methyl magnesium halide.

9. The process for preparing a steroid of the formula

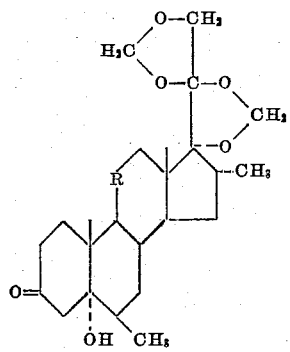

which comprises treating a compound of the formula

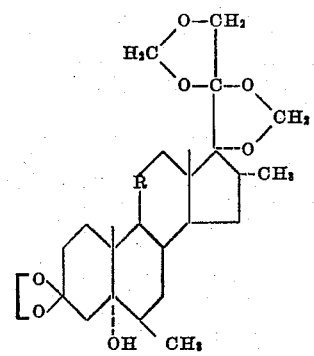

with a dilute mineral acid, wherein R is selected from the class consisting of

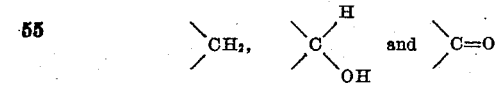

10. The process that comprises treating a compound of the formula

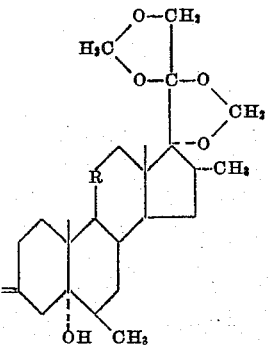

with a strong base to produce a compound of the formula

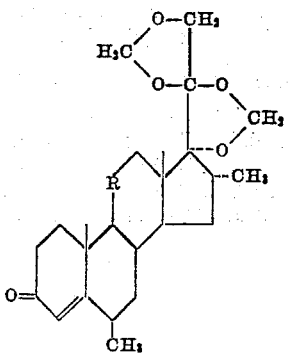

wherein R is selected from the class consisting of

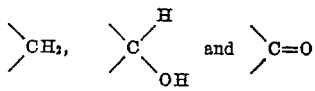

11. The process for preparing 6α,16α-dimethyl-17-20, 20-21 bismethylenedioxy - 4 - pregnen-3-one-11β-ol that comprises heating a solution of 6β,16α-dimethyl-17-20, 20-21 bismethylenedioxy - allopregnan-3-one-5α,11β-diol in the presence of an alkali metal hydroxide.

12. The process for preparing 6α,16α-dimethyl-17-20, 20-21 bismethylenedioxy-4-pregnen-3-one that comprises heating a solution of 6β,16α-dimethyl-17-20,20-21 bismethylenedioxy-allopregnan-3-one-5α-ol in the presence of an alkali metal hydroxide.

13. The process for preparing 6α,16α-dimethyl-17-20, 20-21 bismethylenedioxy-4-pregnene-3,11-dione that comprises heating a solution of 6β,16α-dimethyl-17-20,20-21 bismethylenedioxy-allopregnan-3,11-dione-5α-ol in the presence of an alkali metal hydroxide.

14. A compound of the formula

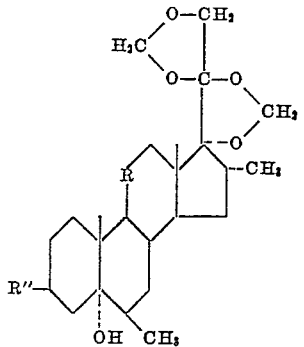

wherein R is selected from the group consisting of

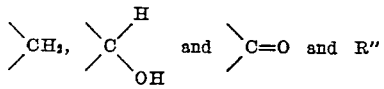

is selected from the class consisting of keto and groups convertible thereto by hydrolysis.

15. 6β,16β-dimethyl-17-20,20-21 bismethylenedioxy-3-ethylenedioxy-allopregnan-5α,11β-diol.

16. 6β,16β - dimethyl-17-20,20-21 bismethylenedioxy-allopregnan-3-one-5α,11β-diol.

17. 6β,16β-dimethyl-17-20,20-21 bismethylenedioxy-3-ethylenedioxy-allopregnan-11-one-5α-ol.

18. 6β,16β - dimethyl-17-20,20-21 bismethylenedioxy-allopregnan-3,11-dione-5α-ol.

19. The process for preparing a steroid of the formula

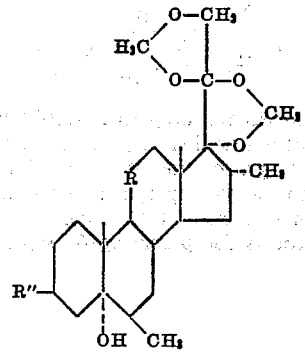

that comprises treating a compound of the formula

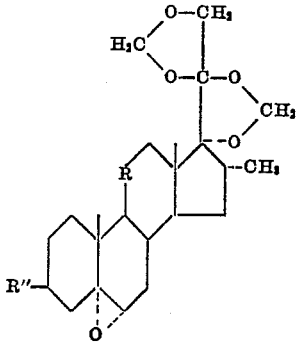

with methyl magnesium halide, wherein R is selected from the class consisting of

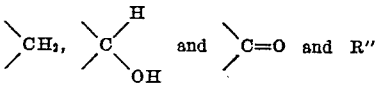

is a group convertible to a keto group on hydrolysis.

20. The process for preparing 6β,16β-dimethyl-17-20, 20-21 bismethylenedioxy-3-ethylenedioxy-allopregnan-5α, 11β-diol that comprises treating 16β-methyl-17-20,20-21 bismethylenedioxy - 3 - ethylenedioxy-5α,6α-oxido-allopregnane-11β-ol with methyl magnesium halide.

21. The process that comprises treating a compound of the formula

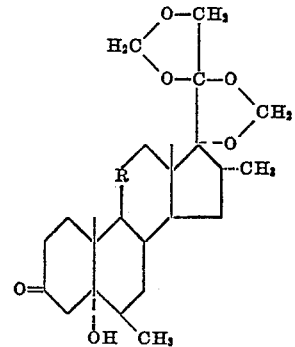

with a strong base to produce a compound of the formula

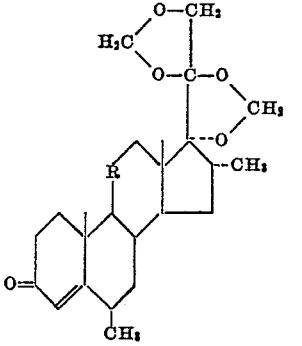

wherein R is selected from the class consisting of

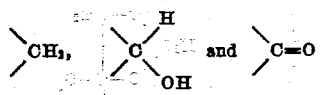

22. The process for preparing 6α,16β-dimethyl-17-20,20-21 bismethylenedioxy-4-pregnen-3-one-11β-ol that comprises heating a solution of 6β,16β-dimethyl-17-20,20-21 bismethylenedioxy-allopregnan-3-one-5α,11β-diol in the presence of an alkali metal hydroxide.

23. The process for preparing 6α,16β-dimethyl-17-20,20-21 bismethylenedioxy-4-pregnene-3,11-dione that comprises heating a solution of 6β,16β-dimethyl-17-20,20-21 bismethylenedioxy-allopregnan-3,11-dione-5α-ol in the presence of an alkali metal hydroxide.

References Cited in the file of this patent

Spero et al.: 78, J.A.C.S., 6213–14 (1956).
Beyler et al.: 80, J.A.C.S., 1517–18 (1958).
Arth et al.: 80, J.A.C.S., 3160–62 (1958).
Oliveto et al.: 80, J.A.C.S., 4428 (1958).
Taub et al.: 80, J.A.C.S., 4435 (1958).